Dec. 4, 1928.
R. R. DEBACHER
BAIL FOR PAILS AND THE LIKE
Filed Oct. 14, 1927
1,694,165
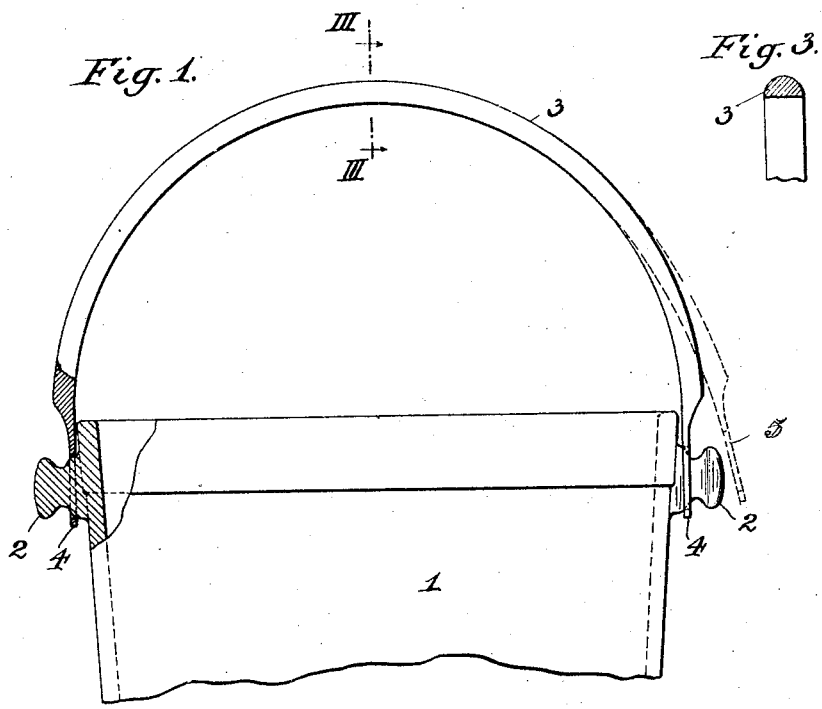
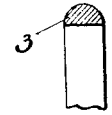
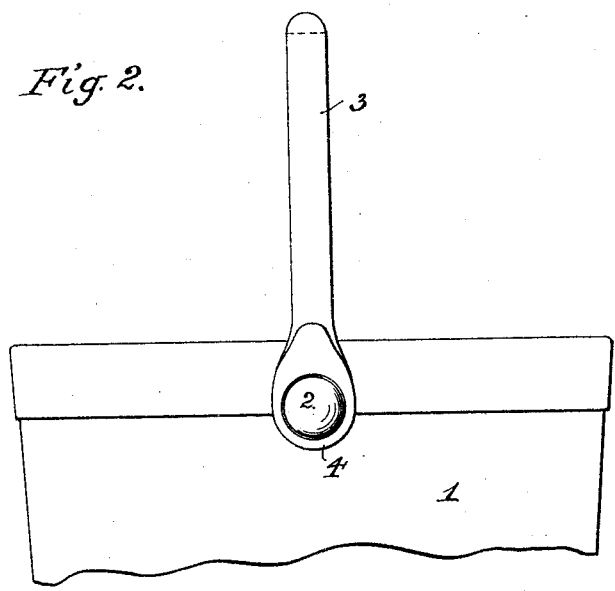
INVENTOR
Robert R. Debacher
BY
his ATTORNEYS Patented Dec. 4, 1928.

1,694,165

UNITED STATES PATENT OFFICE.

ROBERT R. DEBACHER, OF NEW YORK, N. Y.

BAIL FOR PAILS AND THE LIKE.

Application filed October 14, 1927. Serial No. 226,132.

This invention relates to bails for pails and the like.

It has for an object to provide such an article which is so constructed as to yieldingly hold itself in position on the receptacle in connection with which it is used, while admitting of ready removal therefrom when, for instance, it is desired to wash the receptacle.

Another object consists in providing such an article which is so constructed as to automatically retain its position closely against the side walls of the receptacle when in use, and which has no part entering a portion of the receptacle.

Another object consists in providing such a device which is fitted for cooperative engagement with grooved studs projecting from the exterior of the receptacle at opposite points, and which will retain its operative position in engagement with said studs in spite of the fact that it encompasses the studs with apertures greater in cross-section than the portions of the stud lying outside of the bail when in operative position.

Another object consists in providing an improved structure of the ends of the bail and complementary studs, whereby efficient cooperative action is obtained.

Another object consists in providing such an article which is exceptionally simple and cheap to manufacture, while at the same time strong and handsome in appearance.

A further object consists in providing certain improvements in the form, construction and arrangement of the several parts whereby the above named and other objects may effectively be attained.

A practical embodiment of the invention is represented in the accompanying drawings, in which Fig. 1 represents a side elevation, partly broken away, showing my invention applied to a small bucket or pail; one end of the bail being shown in different positions in full and dotted lines, Fig. 2 represents a side elevation taken at right angles to Fig. 1, and Fig. 3 represents a detail section taken in the plane of the line III—III of Fig. 1, looking in the direction of the arrows.

The pail or bucket is marked 1, and may be of any well known or approved form. It may be composed of glass or other suitable material.

At each side of the bucket, in diametrically opposed positions and adjacent its upper edge, is secured a stud 2. This may be attached to the bucket as, for instance, by fusion or any suitable adhesive substance.

The shape of the studs is well shown in the drawings, and it will be observed, by reference to Fig. 1, that each stud has a broad base adjacent the pail, tapers down to a substantially centrally disposed groove, and then expands into an enlarged head which is somewhat smaller than the base.

The bail is marked 3, and it is preferably of half round cross-section, as well shown in Fig. 3.

The said bail may be composed of stock material which is of suitable size and which preferably consists of slightly resilient metal.

In manufacturing the bail, a suitable length is severed from the stock, and the ends of the said length are flattened, as indicated at 4, 4, in Fig. 1, making them wider and thinner than the remainder of the bail. This flattening operation may conveniently be performed by a drop hammer.

The ends of the bail are then subjected to the action of a die or the like for suitably rounding the same, as represented in Fig. 2; and are also punched to form apertures 5 therein.

Following this procedure, the bail is curved into a substantially semi-circular form, as indicated in Fig. 1, and this curving is carried to such an extent that the normal spacing of the ends 4, 4, is somewhat less than the diametrical distance from the groove in one stud to the groove in the other stud of the receptacle in connection with which the bail is designed to be used.

The apertures 5 are made of slightly greater cross-sectional area than the heads of the studs 2.

Following the formation of the bail, it is assembled with the receptacle by passing one aperture over a stud, then springing the other end out substantially to the position shown in dotted lines in Fig. 1 and permitting it to contract over the other stud into the position shown in full lines in said Fig. 1.

The normal spring tendency of the bail will cause it to hug tightly the base of the studs and, by reason of the fact that the said bases are larger in cross-section than the sections of the apertures 5, the bail will be prevented from coming in contact with the upper edges of the receptacle while, at the same time, holding close to the sides thereof. The grooves and enlarged heads on the studs serve, in a manner that will be clearly understood, to provide a seat for the bail when it is under the strain of use, and to prevent it from slipping off the studs in case the weight within the receptacle is substantial.

This construction produces a very sightly assembly as well as one that is convenient and very strong. There is no hook-like arrangement entering a recess in the receptacle, which arrangement has a tendency to automatically become detached from the receptacle when out of use and to be distorted and separated from the receptacle under the strain of use. This invention also provides particularly for imparting an ornamental appearance to the article by virtue of the shape and construction of the studs and cooperating ends of the bail. The half round section of the bail lends itself to appearance and strength while, at the same time, permitting the inside of the ends to lie closely adjacent to the walls of the receptacle.

It will be understood that various changes may be resorted to in the form, construction and arrangement of the several parts without departing from the spirit and scope of my invention; hence, I do not intend to be limited to the details herein shown and described except as they may be included in the claims.

What I claim is:

1. An article of the character described having, in transverse cross sectional form, less thickness at its edges than in the portion intermediate its edges, and having a substantially flat surface and flattened end portions, said end portions being of a thickness less than half that of the main body portion, of a width appreciably greater than the width of the main body portion and provided with apertures greater in diameter than the width of said main body portion, the apertures being adapted to engage projections on a receptacle, and the said article being composed of a resilient material such that it will retain itself in engagement with a receptacle by virtue of such resiliency.

2. In combination, a receptacle and a bail therefor, said receptacle having projections thereon adapted for cooperative engagement with the bail, said bail having apertures in its ends for encompassing said projections, said projections having their bases greater in cross section than said apertures, their extremities less in cross section than said apertures and intermediate grooves less in cross section than their extremities, and said bail being composed of resilient material whereby its extremities are normally urged toward the walls of the receptacle and against the bases of the projections for retaining it in engagement therewith.

3. An article of the character described having, in transverse cross sectional form, less thickness at its edges than in the portion intermediate its edges and greater width from side to side than thickness from inner surface to outer surface, and having flattened and thinned end portions, said end portions being provided with apertures adapted to engage projections on a receptacle, and said article being composed of a resilient material such that it will retain itself in engagement with a receptacle by virtue of such resiliency.

In testimony, that I claim the foregoing as my invention, I have signed my name this 11th day of October, 1927.

ROBERT R. DEBACHER.